United States Patent
Webster

[11] Patent Number: 6,014,812
[45] Date of Patent: *Jan. 18, 2000

[54] BATTERY POWERED VEGETATION TRIMMER

[75] Inventor: Craig Webster, Newcastle-upon-Tyne, United Kingdom

[73] Assignee: Black & Decker, Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,122

[22] Filed: Nov. 6, 1997

[30] Foreign Application Priority Data

Nov. 8, 1996 [GB] United Kingdom .................... 9623309
Jun. 5, 1997 [GB] United Kingdom .................... 9711511

[51] Int. Cl.[7] .................................................. A01D 50/00
[52] U.S. Cl. .............................................. 30/276; 56/12.7
[58] Field of Search ................................ 30/276; 56/12.1

[56] References Cited

U.S. PATENT DOCUMENTS

| | | | |
|---|---|---|---|
| 3,959,879 | 6/1976 | Sellers | 30/276 |
| 4,578,863 | 4/1986 | Laverick | 30/276 |
| 4,848,846 | 7/1989 | Yamada et al. | 30/276 |
| 4,924,573 | 5/1990 | Huddleston et al. | 30/272.1 |
| 5,174,099 | 12/1992 | Matsuura | 56/12.1 |
| 5,181,369 | 1/1993 | Everts | 56/12.7 |
| 5,265,341 | 11/1993 | Kikuchi | 30/276 |
| 5,566,455 | 10/1996 | Hagstrom | 30/276 |
| 5,771,670 | 6/1998 | Perry | 30/276 |

FOREIGN PATENT DOCUMENTS

| | | |
|---|---|---|
| 0145284 | 11/1984 | European Pat. Off. . |
| 0515909 | 5/1992 | European Pat. Off. . |
| 2661066 | 10/1991 | France . |
| 8634082 | 2/1989 | Germany . |
| 1467252 | 3/1977 | United Kingdom . |
| 2187926 | 9/1987 | United Kingdom . |
| 9215193 | 9/1992 | WIPO . |

*Primary Examiner*—Hwei-Siu Payer
*Attorney, Agent, or Firm*—Ajay K. Gambhir

[57] ABSTRACT

A hand held battery powered vegetation trimmer includes a battery pack that powers an electric motor to generate a rotary output and a cutting line adapted to be rotatably driven by a line support structure. By introducing a reduction gear stage between the motor output and the line support structure, the speed at which the line is rotated is reduced which substantially reduces the power consumption of the trimmer without reducing the cutting performance of the line.

41 Claims, 4 Drawing Sheets

BATTERY POWERED VEGETATION TRIMMER

BACKGROUND OF THE INVENTION

The present invention relates to a battery powered vegetation trimmer of the type in which a rotating line, string or wire (hereafter referred to as line) is used to cut vegetation, particularly grass.

In known battery powered vegetation trimmers of this type, a battery pack powers an electric motor. A rotary output of the electric motor directly drives a line support structure in a rotatable manner. The line is supported by the line support structure so that an end section of the line extends from the structure. As the structure rotates, the end section of the line is rotated and will cut any light vegetation or grass which comes into the path of the line.

A vegetation trimmer is designed so that the weight of the trimmer is supported by the user. The height, orientation and direction of movement of the cutting head of the trimmer, when in use, is determined by the way in which the user holds and moves the trimmer. As a vegetation trimmer has to be supported by the user, it is important to keep the weight of the trimmer to a minimum. This is achieved by minimising the weight of the various component parts of the vegetation trimmer, for example, the weight of the battery or motor.

A problem with known battery powered vegetation trimmers is achieving an acceptable run time before the battery requires recharging. In order to achieve acceptable run times large (and thus heavy) batteries or relatively expensive batteries have to be used, neither of which are ideal. Therefore, when designing a battery powered vegetation trimmer, there is always a balance between run time and either weight or expense.

One way of overcoming this problem is to use two interchangeable batteries to power a vegetation trimmer. When one of the batteries becomes discharged through use on the trimmer it is replaced by a second battery, which itself can be replaced by a third battery or by the first battery which is recharged while the second is in use. The disadvantage to this solution is that at least two batteries must be purchased by a user, which adds cost. Also, replacement of the batteries interrupts the use of the trimmer.

SUMMARY OF THE INVENTION

The present invention overcomes the above problems by providing a battery powered vegetation trimmer which provides acceptable run times without requiring either expensive, heavy or multiple batteries.

According to the present invention there is provided a hand held battery powered vegetation trimmer which in use is substantially supported by a user above the ground in a cutting position, the trimmer comprising;
 a battery pack which powers an electric motor to generate a rotary output, and
 a cutting line which is adapted to be rotatably driven by a line support structure,
 characterised in that;
  the rotary output drives the line support structure via a reduction gear stage.

By introducing a reduction gear stage between the motor output and the line support structure the speed at which the line is rotated is reduced which substantially reduces the power consumption of the trimmer without reducing the cutting performance of the line. This is a surprising result as cutting performance would be expected to drop as the speed of rotation of the line is reduced. Power consumption is reduced by such an extent by using a reduction gear stage that a less powerful motor may be used in the trimmer and still give an acceptable cutting performance. Use of such a motor will reduce the size, weight and cost of the vegetation trimmer. Ideally, the weight of the motor is less than 1 kg and preferably less than 0.5 Kg. This enables the size and weight of the trimmer to be kept within reasonable proportions in order for the users to support and operate the trimmer.

The large reductions in power consumption are achieved mainly by a reduction in the aerodynamic energy losses because of the reduction in the speed of rotation of the line.

As a further added advantage the increased torque with which the line support structure rotates the line, because of the use of a reduction gear stage, allows the trimmer to cope in difficult cutting conditions. The trimmer according to the present invention does not slow down so much when cutting tough or heavy vegetation and is more difficult to stall.

Preferably, the reduction ratio is between a 2:1 reduction and a 4:1 reduction. This range of reduction ratios gives a good reduction in power consumption while not reducing the line speed so much that cutting performance of the line is effected. More preferably, the reduction ratio is between 2.5:1 and 3:1.

The gear reduction stage ideally comprises a pair of intermeshing gears. Such gear arrangements include but are not limited to epicyclic, parallel axis and bevel gear arrangements. Alternatively, the gear reduction stage may comprise a belt drive arrangement.

Good cutting performance at low power consumption can be achieved when the speed of rotation of the line support structure is preferably between 5,000 and 9,000 rpm or more preferably between 6,000 and 9,000 rpm, or ideally between 7,000 and 8,500 rpm when there is no cutting load on the trimmer.

When a reduction gear stage is used between the motor and the line support structure, as compared to an equivalent trimmer in which the line support structure is directly driven by the motor, the motor will run much faster. This results in the kinetic energy of the motor being much higher and thus the total mechanical energy of the system available to cut is higher which increases the stall torque and makes the trimmer harder to stall. Thus, the speed of rotation of the motor when there is no cutting load on the trimmer is preferably between 10,000 rpm and 28,000 rpm or more preferably between 13,000 and 28,000 rpm and ideally between 19,000 and 23,000 rpm.

The batteries used in the trimmer may be Nickel/Cadmium batteries which are robust, have a high discharge current capability, have a longer life and a low weight. Alternatively, Lead/Acid batteries may be used as they are cheap and provide a good improvement in trimmer run time for reductions in power consumption in the ranges achieved by the introduction of a gear reduction stage on a direct drive cordless vegetation line trimmer.

The vegetation trimmer may be arranged with a handle portion located at a first end of a support tube and a cutting head, which houses the line support structure, located at a second opposite end of the support tube. The battery pack may be releasably attachable to the handle portion in order to allow charging of the battery with the battery either attached to the trimmer (on-board charging) or detached from the trimmer (off-board charging). The electric motor is housed in the cutting head and drives the line support structure also located in the cutting head via the reduction gear stage.

The battery powered vegetation trimmer may have a support guide. The support guide can take the form of a skid bar or wheel located at the back of the cutting head of the trimmer. It can assist the user in directing and positioning the cutting head of the trimmer when carrying out certain tasks such as edging.

The battery powered vegetation trimmer may have a 30.5 cm (12 inches) cutting swathe. The power required to drive the cutting line of a string trimmer is dependent on the length of the line which extends from the line support structure. The introduction of a reduction gear stage between the motor output and the line support structure reduces the power consumption of the string trimmer whilst increasing the torque by which the line support structure rotates the line. Therefore, by using a gear reduction stage, it is possible to have a battery powered string trimmer which has a cutting line which extends further from the line support structure and hence has a larger cutting swath, than it is possible with battery powered string trimmers without a gear reduction stage whilst still having an acceptable cutting performance. By having a larger cutting swathe, the string trimmer is able to cut a larger area in each sweep.

DETAILED DESCRIPTION OF PREFERRED EMBODIMENT

Figure 1:
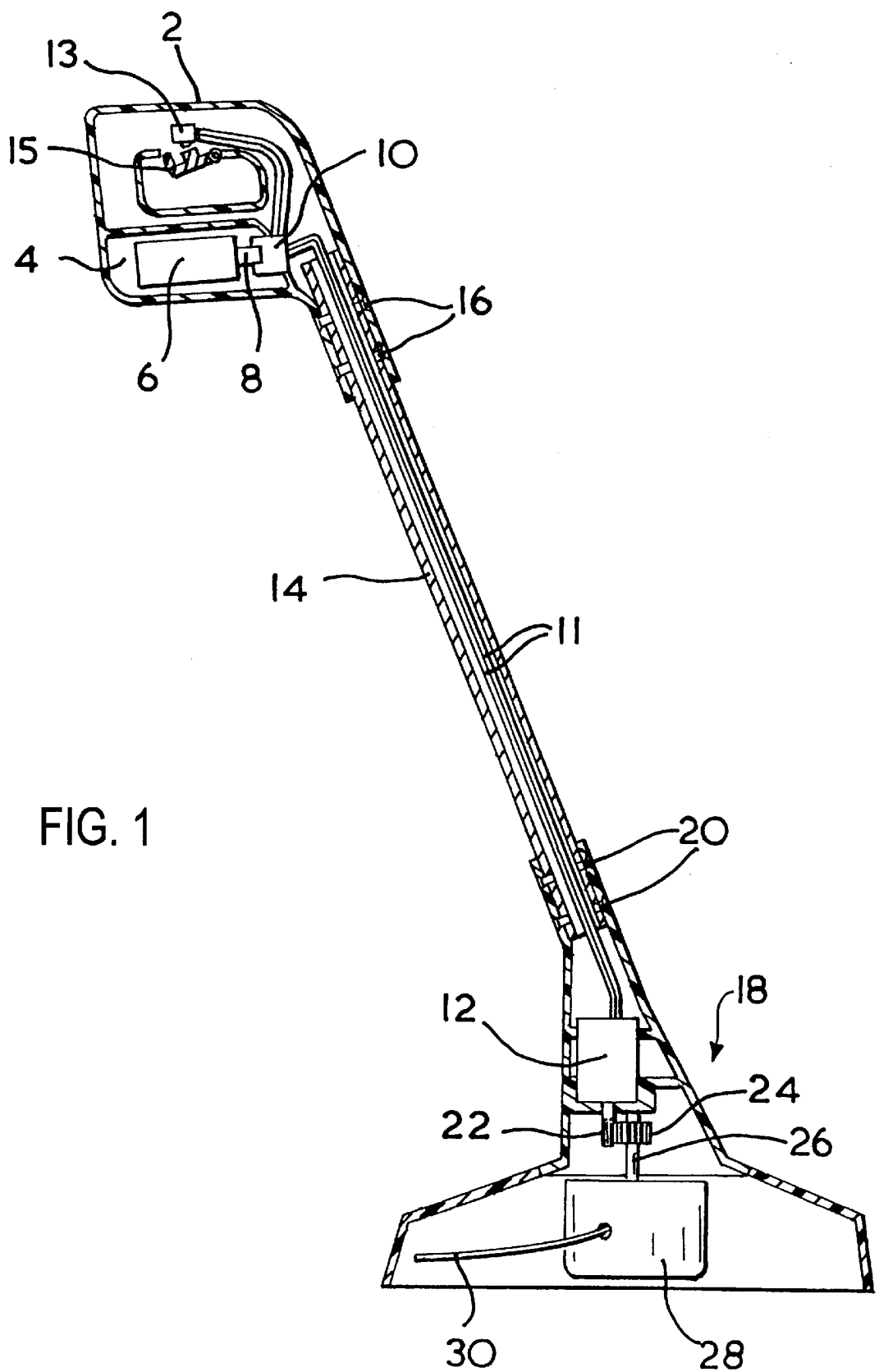
FIG. 1 shows a cordless vegetation trimmer according to the present invention.

The trimmer shown in FIG. 1 has a handle portion (2) to which is clipped a battery pack (4) incorporating a battery (6). The battery is connected to a plug (8) which, when the battery pack is clipped to the handle is received in a socket (10) and electrically connects therewith. The battery is connected to leads (11) via a switch (13) operable by depressing the lever (15) against the action of a spring (not shown). The leads (11) extend from the socket to carry electrical current from the battery (6) to the motor (12) through a length of tube (14). The handle (2) is secured to one end of the length of tube by fastenings (16) and a cutting head (18) is secured to the other end of the length of tube by fastenings (20). The motor (12) is supported in the cutting head (18) by brackets. The pinion (22) from the motor meshes with a gear wheel (24) to rotatably drive the gear. The gear (24) is non-rotatably mounted on a spindle (26) which thus rotates with the gear. The spindle (26) rotatably drives a line support structure (28) at a lower speed of rotation than the speed of rotation of the motor (12) and pinion (22) because of the gear reduction stage, i.e. gear wheel (24) between the motor and the line support structure (28). The line support structure (28) is of conventional construction and houses a spool which carries a length of line. An end portion of the line (30) extends from a hole in the line support structure. The length of the line (30) which extends from the hole is such to provide a 30.5 cm cutting swathe. However, the length of the line can be varied to suit the particular application.

Figure 2:
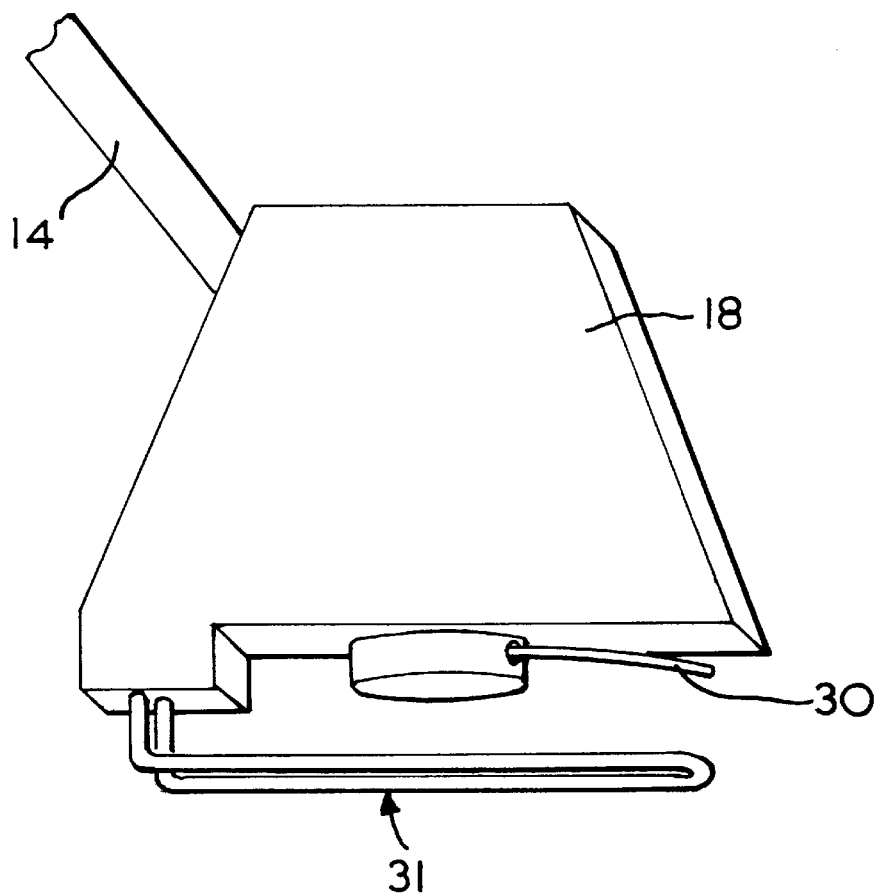
FIG. 2 shows a side view of a cutting head similar to FIG. 1 further having a guide structure attached to its underside.

FIG. 2 shows a side view of a cutting head (18) similar to that disclosed in FIG. 1 further having a guide structure attached to its underside. The guide structure comprises a 'U' shaped metal rod (31) which has its ends bent at 90° to the plane of the 'U' and which connects towards the rear of the underside of the cutting head (18).

The guide structure (31) provides assistance to the guidance of the cutting head by the user when in use. The guide structure can help the user maintain the cutting head (18) and hence the cutting line (30) at a constant height above the ground when in use. The front of the guide structure can be used to help the user guide the cutting head (18) over the ground when the trimmer is being used as an edger, i.e. the cutting head is orientated so that the axis of rotation of the line support structure, when in use, is horizontal.

When the battery pack (4) is clipped to the handle (2) of the trimmer and the switch lever (15) is depressed, electrical current flows from the battery via the closed switch (13) and leads (11) to actuate the motor (12). Actuation of the motor causes the pinion (22) to rotate and the pinion rotatably drives the spindle (26) via gear wheel (24) at a lower speed of rotation. The line support structure (28) is fixed to and thus rotates with the spindle (26) to rotate the end section of line (30).

The motor (12) weighs 0.2 Kg. This enables the overall weight of the trimmer to be kept at a reasonable level to enable a user to easily operate the trimmer. The type of motor (12) used is that of a permanent magnet DC electric motor.

The rotating line will cut vegetation. When the line becomes worn a further length of line can be fed from the line support structure in a known manner either manually or by tapping the trimmer on the floor to depress a button to release a length of line (so called bump feed) or automatically (so called auto feed).

Figure 3:
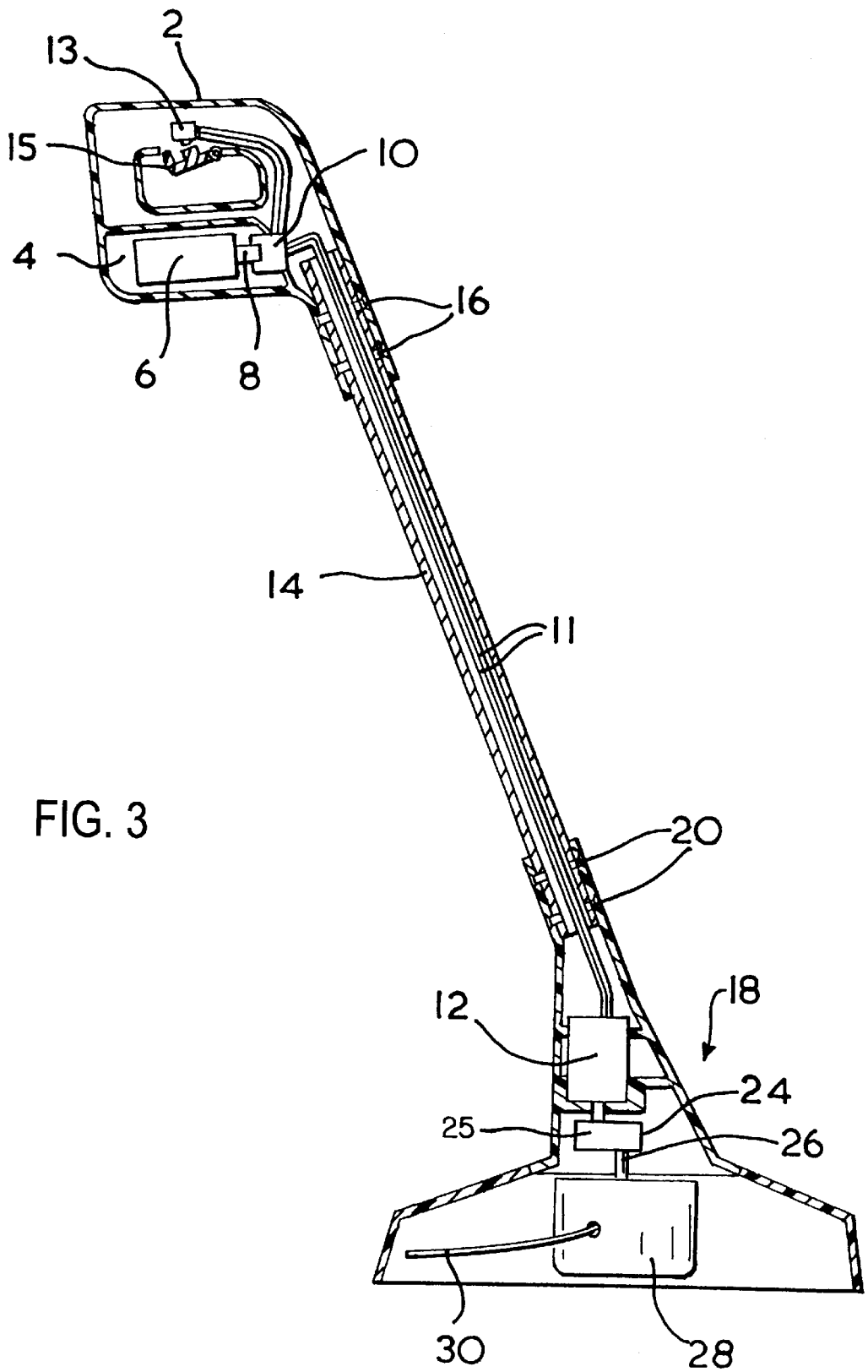
FIG. 3 shows a cordless vegetation trimmer similar to FIG. 1 but with a bevel gear arrangement.
Figure 4:
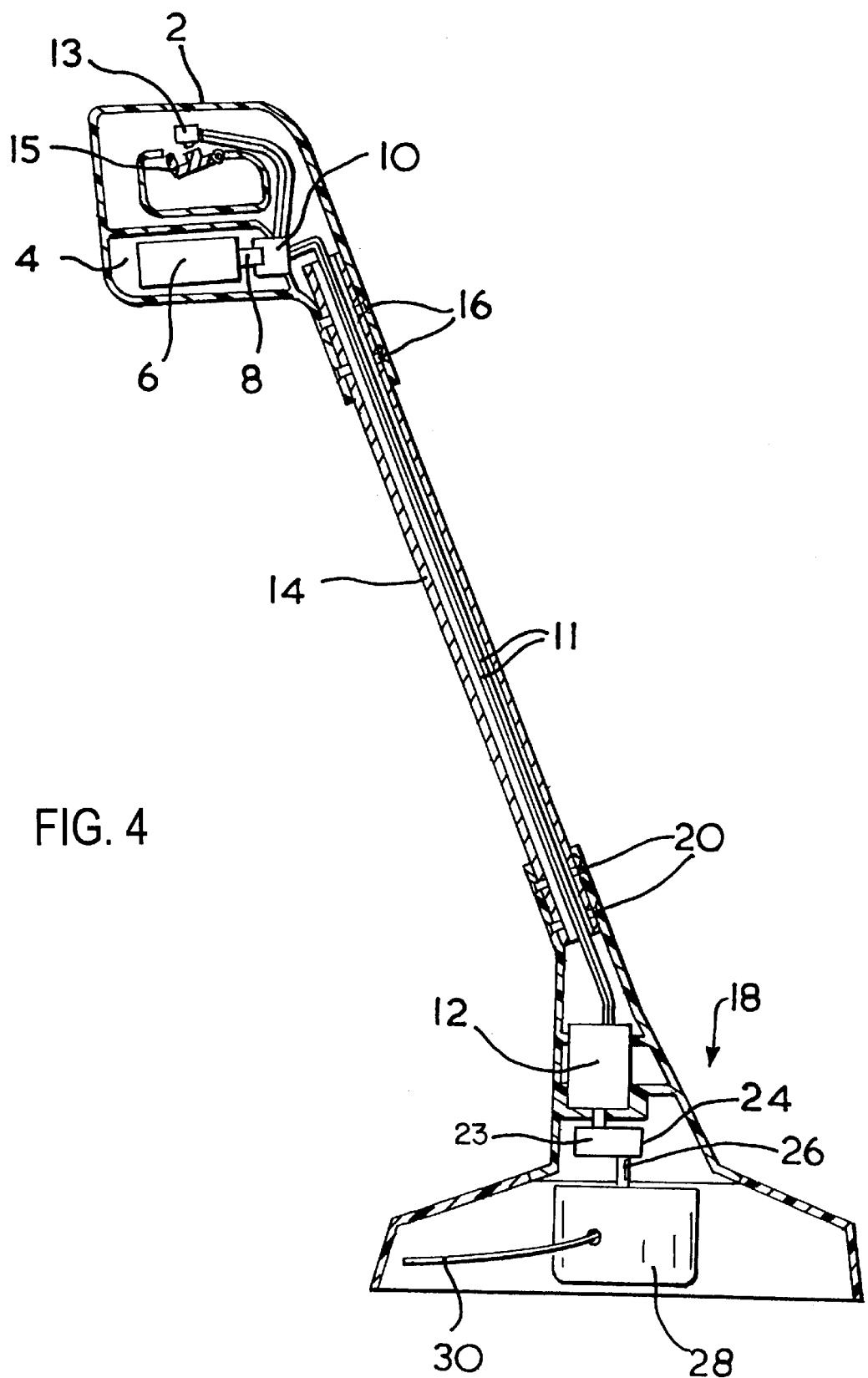
FIG. 4 shows a cordless vegetation trimmer similar to FIG. 1 but with a belt drive gear arrangement.

The gear reduction stage can comprise epicyclic, parallel axis, bevel 25 (FIG. 3) or belt drive 23 (FIG. 4) gear arrangement. However, whatever the type of gear arrangement used, the effect of using a gear reduction stage, on the power consumption of a battery powered vegetation trimmer is made clear by the following examples.

Rotation of a line support structure with a section of line extending therefrom to give a 9 inch swath at a no load speed of 10,000 RPM (which speed is typical of line support structures that are driven directly by the motor) gives a power consumption of 117 Watts. Rotation of the same line support structure with the same section of line extending therefrom at a no load speed of 7,000 RPM (via a reduction gear stage) gives a power consumption of 50 Watts.

Some further results are shown in Table 1.

For a conventional direct drive cordless vegetation line trimmer with a 9 inch diameter of cut (swath) which uses a 12 Volt nickel cadmium battery, the rpm of the cutting line (and of course the motor) with no load on the trimmer (i.e. trimmer not cutting) was measured at 10,500 rpm and the power drain from the battery was 100 Watts. With a 2.5:1 gear reduction stage added between the motor and the line support structure, the motor rpm (no load) increases to 21,250, the no load rpm of the cutting line (the same as the no load rpm of the line support structure) decreases to 8,500 and the power consumption is reduced by 50% to 50 Watts.

Results are also shown in Table 1 for a 10 inch diameter of cut conventional direct drive vegetation line trimmer powered by 12 volt lead acid batteries which is modified by adding a 2.5:1 reduction gear stage and a 12 inch diameter of cut conventional direct drive vegetation line trimmer powered by 12 volt lead acid batteries which is modified by adding a 3:1 reduction gear stage.

In every example shown in Table 1 the motor rpm (no load) increases by at least 100%, the cutter rpm (no load)

decreases by between approximately 15% and 30% and the power drain from the battery decreases by at least 50%.

This reduction in power consumption can enable:

a. An extension in run time if the battery remains unchanged. In the examples in Table 1, run time increased by up to 160%.

b. Use of a smaller, lighter and cheaper battery if run time remains unchanged.

c. Use of a less powerful motor which can be smaller, lighter and cheaper.

TABLE 1

| UNIT | SWATH | NO LOAD POWER | BATTERY | RUN TIME | CUTTER RPM | GEAR RATIO | MOTOR RPM |
|---|---|---|---|---|---|---|---|
| CONVENTIONAL DIRECT DRIVE | 9" | 100 Watts | 12 V 1.3Ah NiCad | 10 MINS | 10,500 | | 10,500 |
| GEARBOX DRIVE | 9" | 50 Watts | 12 V 1.3Ah NiCad | 19 MINS | 8,600 | 2:51 | 21,250 |
| CONVENTIONAL DIRECT DRIVE | 10" | 130 Watts | 12 Volt Lead Acid 7.2Ah | 25 MINS | 10,000 | | 10,000 |
| GEARBOX DRIVE | 10" | 64 Watts | 12 Volt Lead Acid 7.2Ah | 55 MINS | 8,000 | 2:51 | 20,000 |
| CONVENTIONAL DIRECT DRIVE | 12" | 182 Watts | 12 Volt Lead Acid 7.2Ah | 17 MINS | 9,500 | | 9,500 |
| GEARBOX DRIVE | 12" | 78 Watts | 12 Volt Lead Acid 7.2Ah | 46 MINS | 7,000 | 3:1 | 21,000 |

I claim:

1. A hand held battery powered vegetation trimmer substantially supported in use above ground in a cutting position, the trimmer comprising:
   an electric motor;
   a battery pack that powers the electric motor to generate a rotary output;
   a cutting line adapted to be rotatably driven by a line support structure; and
   a reduction gear stage through which the rotary output drives the line support structure, wherein
      the reduction gear stage has a reduction ratio between about 2:1 and 4:1,
      the line support structure has a rotation speed of between about 5,000–9,000 rpm when there is no cutting load on the trimmer, and
      a rotation speed of the motor is between about 13,000–28,000 rpm when there is no cutting load on the trimmer.

2. A hand held battery powered vegetation trimmer substantially supported in use above ground in a cutting position, the trimmer comprising:
   an electric motor;
   a battery pack that powers the electric motor to generate a rotary output;
   a cutting line adapted to be rotatably driven by a line support structure; and
   a reduction gear stage through which the rotary output drives the line support structure, wherein the reduction gear stage has a reduction ratio between about 2:1 and 4:1.

3. The battery powered vegetation trimmer of claim 2, further comprising a support guide.

4. The battery powered vegetation trimmer of claim 2, wherein the cutting line has a cutting swath of about 30.5 cm.

5. The battery powered vegetation trimmer according to claim 2, wherein the reduction ratio is between about 2.5:1 and 3:1.

6. The battery powered vegetation trimmer according to claim 2, wherein the reduction gear stage comprises a pair of intermeshing gears.

7. The battery powered vegetation trimmer of claim 2, wherein the reduction gear stage comprises an epicyclic, parallel axis or bevel gear arrangement.

8. The battery powered vegetation trimmer of claim 2, wherein the reduction gear stage comprises a belt drive arrangement.

9. The battery powered vegetation trimmer of claim 2, wherein the line support structure has a rotation speed of 5000 to 9000 rpm when there is no cutting load on the trimmer.

10. The battery powered vegetation trimmer of claim 9, wherein the rotation speed of the line support structure is between 6000 and 9000 rpm when there is no cutting load on the trimmer.

11. The battery powered vegetation trimmer of claim 10, wherein the rotation speed of the line support structure is between 7000 and 8500 rpm when there is no cutting load on the trimmer.

12. The battery powered vegetation trimmer of claim 2, wherein the rotation speed of the motor is between 10,000 and 28,000 rpm when there is no cutting load on the trimmer.

13. The battery powered vegetation trimmer of claim 12, wherein the rotation speed of the motor is between 13,000 and 28,000 rpm when there is no cutting load on the trimmer.

14. The battery powered vegetation trimmer of claim 13, wherein the rotation speed of the motor is between 19,000 and 23,000 rpm when there is no cutting load on the trimmer.

15. The battery powered vegetation trimmer of claim 2, wherein the battery pack comprises rechargeable Nickel/Cadmium batteries or Lead/Acid batteries.

16. The battery powered vegetation trimmer of claim 2, further comprising a handle portion located at a first end of a support tube and a cutting head which houses the line support structure located at a second opposite end of the support tube.

17. The battery powered vegetation trimmer of claim 16, wherein the battery pack is releasably attachable to the handle portion.

18. The battery powered vegetation trimmer of claim 16, wherein the electric motor is housed in the cutting head.

19. The battery powered vegetation trimmer of claim 2, wherein the electric motor has a weight of less than 1 kg.

20. The battery powered vegetation trimmer of claim 19, wherein the weight of the electric motor is less than 0.5 kg.

21. A hand held vegetation trimmer comprising:
   a battery powered electric motor;
   a battery pack that powers the electric motor to generate a rotary output;
   a cutting line adapted to be rotatably driven by a line support structure; and
   means for improving efficiency of and reducing power consumption by the electric motor by increasing a speed of rotation of the electric motor while decreasing a speed of the line support structure without impairing cutting performance of the cutting line.

22. The vegetation trimmer of claim 21, wherein the means for improving efficiency of and reducing power consumption by the electric motor comprises a reduction gear stage through which the rotary output drives the line support structure.

23. The vegetation trimmer of claim 22, wherein the reduction gear stage has a reduction ratio between about 2:1 and 4:1.

24. The vegetation trimmer of claim 23, wherein the reduction ratio is between 2.5:1 and 3:1.

25. The vegetation trimmer of claim 22, wherein the reduction gear stage comprises a pair of intermeshing gears.

26. The vegetation trimmer of claim 22, wherein the reduction gear stage comprises an epicyclic, parallel axis or bevel gear arrangement.

27. The vegetation trimmer of claim 22, wherein the reduction gear stage comprises a belt drive arrangement.

28. The vegetation trimmer of claim 22, wherein the reduction gear stage has a reduction ratio of 2:1 and 4:1, the line support structure has a rotation speed of between about 5,000–9,000 rpm when there is no cutting load on the trimmer, and a rotation speed of the motor is between about 13,000–28,000 rpm when there is no cutting load on the trimmer.

29. The vegetation trimmer of claim 28, wherein the reduction ratio is between about 2.5:1 and 3:1, the rotation speed of the line support structure is between about 6,000–9,000 rpm when there is no cutting load on the trimmer, and the rotation speed of the electric motor is between about 13,000–28,000 rpm when there is no cutting load on the trimmer.

30. The vegetation trimmer of claim 29, wherein the rotation speed of the line support structure is between about 7,000–8,500 rpm when there is no cutting load on the trimmer, and the rotation speed of the electric motor is between about 19,000–23,000 rpm when there is not cutting load on the trimmer.

31. The vegetation trimmer of claim 21, wherein the line support structure has a no-load rotation speed of about 7,000 rpm, the power consumption is about 50 watts, and the cutting line has a swath of about 9".

32. The vegetation trimmer of claim 21, wherein the line support structure has a no-load rotation speed of about 8,600 rpm, the power consumption is about 50 watts, and the cutting line has a swath of about 9".

33. The vegetation trimmer of claim 32, wherein the battery pack includes a 12V Nickel-Cadmium battery.

34. The vegetation trimmer of claim 21, wherein the line support structure has a no-load rotation speed of about 8,000 rpm, the power consumption is about 64 watts, and the cutting line has a swath of about 10".

35. The vegetation trimmer of claim 34, wherein the battery pack includes a 12V lead-acid battery.

36. The vegetation trimmer of claim 21, wherein the line support structure has a no-load rotation speed of about 7,000 rpm, and the cutting line has a swath of about 12".

37. The vegetation trimmer of claim 36, wherein the battery pack includes a lead-acid battery.

38. The vegetation trimmer of claim 36, wherein the electric motor has a run time of about 45 minutes.

39. A hand held vegetation trimmer comprising:

a battery powered electric motor having a first rotation speed;

a battery that powers the electric motor to generate rotary output;

a cutting line adapted to be rotatably driven by a line support structure having a second rotation speed, wherein the first and second speeds are selected such that power consumption of the electric motor is decreased without impairing cutting performance of the cutting line.

40. The vegetation trimmer according to claim to claim 39, wherein the first rotation speed is about 2–4 times the second rotation speed.

41. The vegetation trimmer according to claim 39, wherein the second rotation speed is about 7000 rpm and the first rotation speed is about three times the second rotation speed, and the cutting line has a cutting swath of about 12".

* * * * *